United States Patent
Emery

[11] 3,756,475
[45] Sept. 4, 1973

[54] METHOD OF IMPROVING FLOW OF PARTICULATE MATERIAL

[76] Inventor: Robert B. Emery, 1408 Wisteria, Duncan, Okla. 73533

[22] Filed: Mar. 25, 1971

[21] Appl. No.: 128,100

[52] U.S. Cl.................................. 222/195, 259/4
[51] Int. Cl............................................. B65g 3/12
[58] Field of Search........................... 34/10, 57 A; 222/195, 1, 216, 226, 227; 302/52, 53, 54, 57; 259/4, DIG. 17

[56] References Cited
UNITED STATES PATENTS

| | | | |
|---|---|---|---|
| 1,553,476 | 9/1925 | Schuster | 302/53 |
| 2,745,563 | 5/1956 | Dath | 302/52 X |
| 2,786,280 | 3/1957 | Gishler et al. | 34/10 |
| 3,102,603 | 9/1963 | Kerr | 222/195 X |
| 3,204,942 | 9/1965 | Matthys et al. | 222/195 X |
| 3,540,633 | 11/1970 | Eckhardt | 222/195 |
| 3,097,828 | 7/1963 | Grun | 259/4 |

FOREIGN PATENTS OR APPLICATIONS

| | | | |
|---|---|---|---|
| 964,940 | 5/1957 | Germany | 222/195 |

Primary Examiner—Samuel F. Coleman
Attorney—Fishburn, Gold & Litman

[57] ABSTRACT

A method of improving the flow of particulate material from a bin or tank having a discharge opening adjacent the bottom. The discharge opening is shielded from the mass of material in the bin by a shroud which is spaced from the sloping walls of the bin. The upper surface of the shroud is an aerating surface and gas is conducted upwardly from the aerating surface with sufficient velocity to fluidize a column of the particulate material from the shroud upwardly through the material mass, thereby alleviating any tendency for transverse arching of the material between the walls. In addition, at least a portion of the material adjacent the sloping bin walls is aerated to overcome a tendency of the material to bridge circumferentially. As a result, the material flows through the discharge opening at a uniform rate when the pressure head is constant.

9 Claims, 8 Drawing Figures

INVENTOR
ROBERT B. EMERY

PATENTED SEP 4 1973 3,756,475
SHEET 2 OF 2
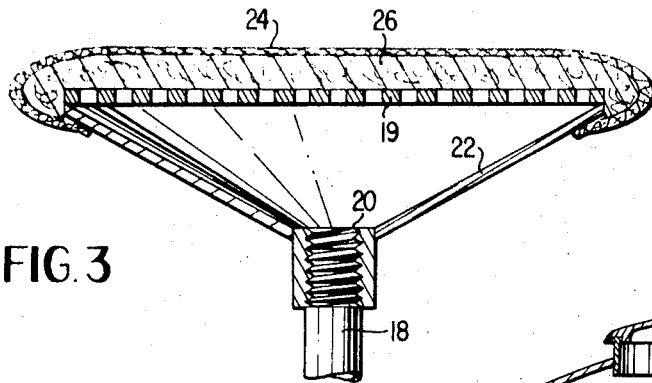
FIG. 3
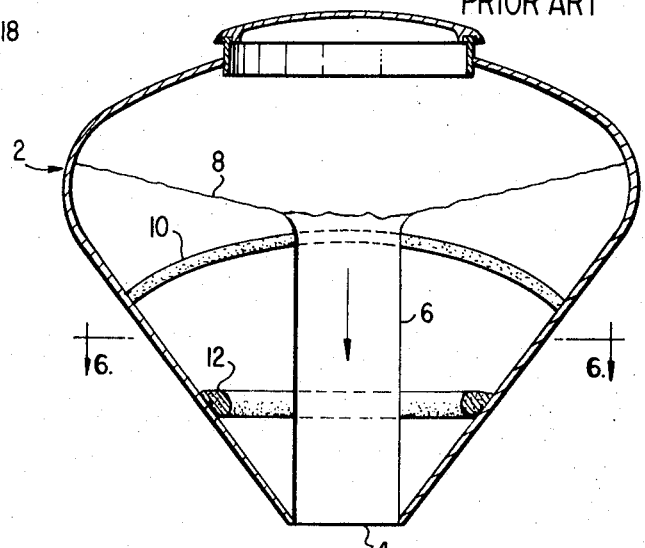
FIG. 5 PRIOR ART
FIG. 6 PRIOR ART
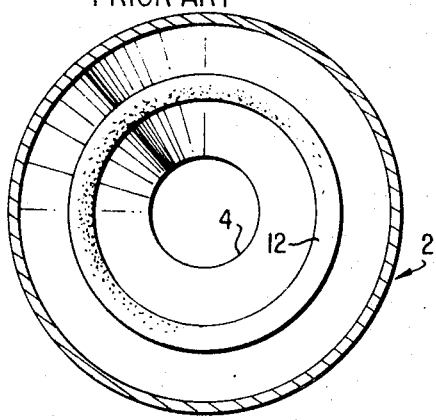
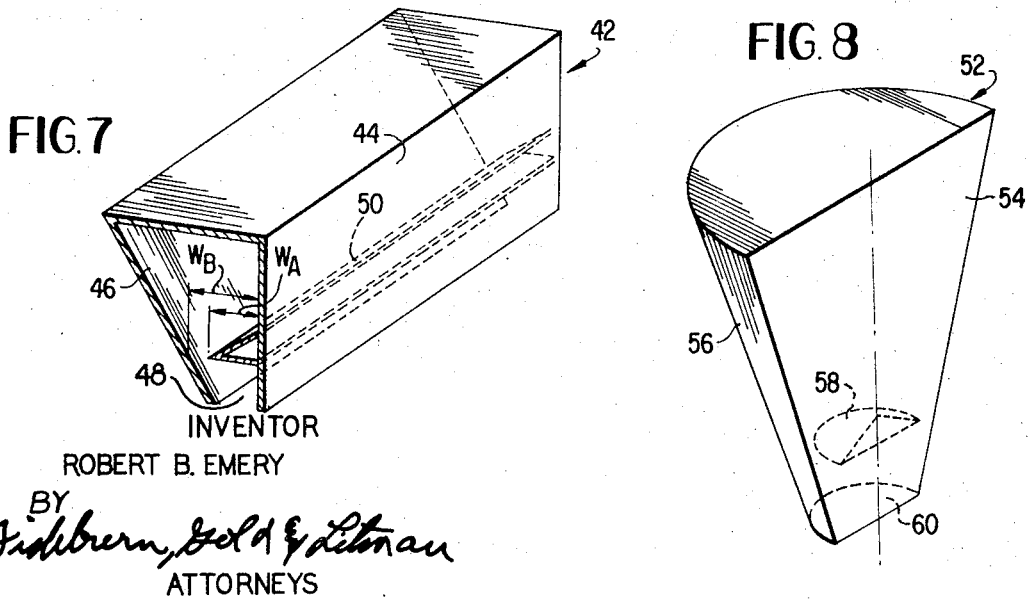
FIG. 7
FIG. 8
INVENTOR
ROBERT B. EMERY
BY
Fishburn, Gold & Litman
ATTORNEYS

3,756,475

METHOD OF IMPROVING FLOW OF PARTICULATE MATERIAL

BACKGROUND OF THE INVENTION

This invention relates to dispensing particulate materials from bins, tanks or similar containers, and more particularly to methods of improving the flow of particulate materials by introducing gas into the bin in which the material is stored.

Containers for the storage of particulate material which are referred to herein as bins or tanks typically having sloping walls which converge toward a bottom discharge opening. Commonly, these bins have frusto conical walls and a discharge opening at the minor diameter of the walls. The bins also may have cylindrical walls extending above the frusto conical walls and may be open at the top, or may be covered.

There is a tendency for pulverulent or particulate materials to consolidate in conventional bins. When the discharge valve is opened, the material at the center of the bin tends to fall vertically through the opening, while the surrounding material adjacent the walls remains motionless. A rathole or a material flow nozzle develops down through the center of the bin and progressive layers roll or slide from the top surface of the material into the rathole or into the flow nozzle, resulting in erratic and uncontrollable flow through the discharge valve. Bins which discharge in this manner are referred to as funnel flow bins. If the bin contains a mixture of sand and cement, for example, the sand has a lower angle of repose and tends to flow into the rathole or the flow nozzle more readily than does the cement. The larger particles tend to move first and the heavier particles move at a faster rate. There is a tendency for the sand and cement to segregate during discharge. As a result, the segregation that naturally occurs when material is deposited in the bin is further exaggerated during discharge. Also, the material that is last placed in the bin tends to be the first material to be discharged through the bottom opening. Consequently, material adjacent the walls of the bin may not be cleaned out until the entire contents of the bin are removed.

To overcome the problems of funnel flow bins, it has been proposed to increase the slope of the bin walls, so that the material flows toward the discharge opening whenever material is withdrawn through the opening. The angle of the sidewall is selected to be sufficiently steep that it exceeds the angle of friction between the material in the hopper and the wall of the bin. The static angle of friction is the slope angle of a wall at which the material resting on the wall begins to slide downwardly along the surface of the wall. Since all of the material in the bin moves downwardly whenever material is withdrawn from the discharge opening, these bins are referred to as mass flow bins. There is a reduced tendency for the material to form ratholes or channels, or to wedge against the sloping walls of the bin.

Although it appears that the problems of controlling flow from bins can be overcome by increasing the angle of slope of the bin wall, there are several factors which do not permit this solution to the problem. For example, it may be necessary to restrict the height of the bin and in order to obtain the desired capacity, the width or diameter of the bin must be large in relation to the size of the discharge opening. Therefore, the walls may have a lower slope than is required to provide mass flow of the material that is to be stored in the bin. Also, there are many existing bins that are presently in use that have insufficient flow characteristics, but nevertheless are used because the cost of replacing the bins is not justified.

Various attempts have been made to improve the flow of materials from the bins or tanks by introducing air into the tank for the purpose of aerating particulate material in the tank to improve the discharge flow characteristics. The term "aerating" as used herein refers to the process of passing gas through a mass of particulate material upwardly with sufficient volume and flow rate to fill the interstitial spaces of the material mass with gas to cause a re-expansion of the compacted material. For example, cement placed in a bin to a depth of ten feet may compact as much as fourteen inches in height due to vibration and normal settling. Aerating separates the particles sufficiently to expand the height of the mass again to the original ten foot head of cement. The injection of gas into the mass allows the particles to move more freely relative to each other and as a result, improves the flow properties of the mass and reduces the tendency of the material to form bridges which would restrict the flow of material toward the discharge opening.

If gas is introduced into a particulate mass in an upward direction with sufficient velocity and volume, the particles in the mass are separated to a greater degree than under normal aerating conditions. As a result, the particles can flow downwardly comparable with a liquid without significant frictional drag or transverse support between adjacent particles. Under these conditions, the mass of particles is "fluidized."

Although prior devices are effective for aerating material in bins or tanks, and for discharging the particulate material through a bottom discharge opening substantially under mass flow conditions, it is desirable to improve the discharge flow characteristics to achieve plug flow. As used herein, the term "plug flow" refers to the downward flow of material at a substantially constant rate in the non-converging flow regions of the bin. The material is remixed as it flows through the hopper. There are no sudden surges of material or other erratic flow conditions, such as many occur in funnel flow bins. Plug flow provides better mixing of the material than mass flow.

SUMMARY OF THE INVENTION

In view of the problems associated with discharging particulate material from bins, tanks or hoppers having walls sloping toward a bottom discharge opening, it is an object of this invention to provide a method for improving the discharge flow of materials.

It is another object of this invention to provide a method for improving the discharge flow characteristics of existing bins, tanks and hoppers without extensive rebuilding or modification of these structures.

Another ojbect of this invention is to provide a method for improving discharge flow of particulate material from bins and similar containers by the addition of relatively inexpensive components.

These objects are accomplished in accordance with a preferred embodiment of the invention by positioning a shroud in a bin or similar container which has sloping walls converging downwardly toward a discharge opening adjacent the bottom of the bin. The shroud is spaced above the discharge opening and shelters the opening from the weight of material in the bin above the shroud. The method includes conducting a stream of gas upwardly from the shroud generally as an upright column through the mass of particulate material with sufficient rate of flow to maintain particles of the material in a fluidized state in the column, and aerating the material throughout the remainder of the bin above the shroud, to cause the material to flow through the gap between the shroud and the bin walls to the discharge opening.

DETAILED DESCRIPTION OF THE DRAWINGS

This preferred embodiment of the invention is illustrated in the accompanying drawings in which:

FIG. 3 is a cross sectional view of the aerator along the line 3—3 in FIG. 2;

FIG. 5 is a schematic view of a tank operated in accordance with prior art discharge methods;

FIG. 6 is a cross sectional view of the tank along the line 6—6 in FIG. 5;

FIG. 7 is a perspective view of a bin of rectangular cross section adapted for operation in accordance with this invention; and FIG. 8 is a perspective view of a bin of semi-circular cross section adapted for operation in accordance with this invention.

DESCRIPTION OF PREFERRED EMBODIMENT

Figure 1:
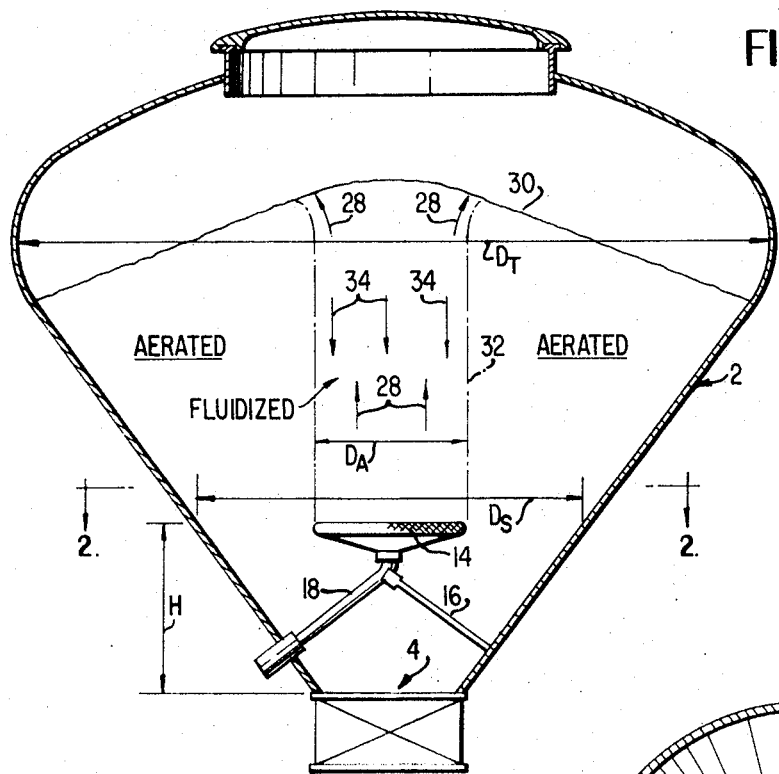
FIG. 1 is a cross sectional view, partially schematic, showing a tank adapted for operation in accordance with this invention.

A conventional tank 2 for storing particulate material is illustrated in FIG. 1. Typically, the frusto conical sidewall of the tank has an included or cone apex angle of about 80°, so that the slope of the wall with respect to a horizontal axis is 50°. The natural angle of repose for commercial grades of pulverulent cement is about 45° and for sand is about 27½°. Therefore, the slope of the sidewall of the tank 2 is slightly greater than the angle of repose for cement, but is considerably greater than the angle of repose for sand. As a result, while the tank 2 is being filled with a mixture of cement and sand, a mound usually forms near the center of the tank and there is greater tendency for the sand than for the cement to pass down the side of the mound toward the tank wall under gravity flow conditions. In a funnel flow bin, the larger or heavier particles would remain static near the tank wall until the material funnel reached them. Then the particles would move down the material funnel faster than the lighter particles. This difference in flow of the two materials causes initial segregation during bin loading and secondary segregation of the cement and sand during unloading.

FIGS. 5 and 6 illustrate schematically the major cause of nonuniform discharge from the tank 2. The sloping sidewall of the tank tends to retard flow of the material toward the bottom discharge opening 4, while the central column of material is free to fall directly through the opening. The slope of the sidewall as measured from the horizontal in tanks where problems of discharge are most common is between twenty degrees and seventy degrees. This flow pattern in which only the central core of material moves through discharge opening 4 and forms a rathole 6 is known as funnel flow. Material is supplied at the top of the rathole by rolling or sliding toward the center of the tank along the surface of the mass of material in the tank. The surface layer 8 has greater freedom to roll or slide in this manner, since it does not bear the pressure of additional material above it.

At lower cross sections of the tank, the material is compacted and a greater frictional resistance to relative movement of the material particles is present. The sidewall provides support for transverse arches 10 in which the particles are held together by normal forces between the wall and the material, and by normal forces between particles, and are unable to move relative to each other due to the weight of material above the arch 10. The arch 10 typically extends around the circumference of the tank and resembles a dome. The diameter of the rathole 6 is usually too small in relation to the diameter of the tank to weaken the dome 10 to the point where it collapses. Sometimes no rat hole is initiated because of the consolidated material dome strength.

Another factor inhibiting uniform flow toward the discharge opening 4 is development of a circumferential bridge as indicated schematically at 12 in FIGS. 5 and 6. The circumferential bridge 12 resembles a ring and bears against the surface of the converging portion of the tank 2. The bridge 12 resists downward movement of the mass of material toward the opening 4, because such movement would require the diameter of the bridge 12 to become smaller. The weight of material above the bridge 12 induces circumferential compressive stresses in the bridge 12 tending to increase the integrity of the bridge.

All of these impediments to discharge of the material from the tank 2 through the bottom opening 4 may be present to a greater or lesser degree in all tanks or bins having sloping walls converging toward a bottom discharge opening, regardless of whether the top of the tank is opened or closed. The effect producing the transverse bridge 10 and the circumferential bridge 12 may be aggrevated further by closing the top of the tank and applying fluid pressure in the space between the surface of the material and the top of the tank. The pressure head on the material increases the tendency of the particles in the material to pack together to form the bridges 10 and 12.

Figure 2:
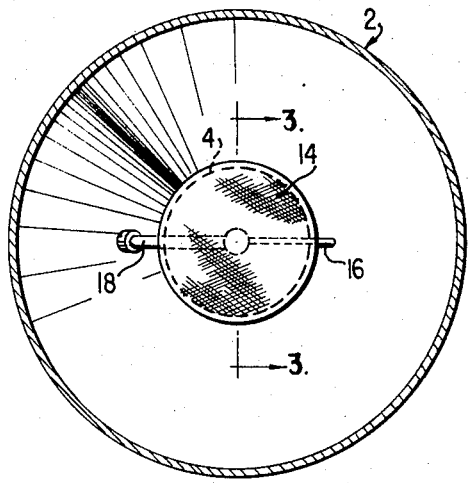
FIG. 2 is a cross sectional view of the tank along the line 2—2 in FIG. 1.

In accordance with this invention, these problems are overcome by introducing gas into the mass of particulate material in the tank in a predetermined pattern to achieve plug flow conditions. In the preferred embodiment illustrated in FIGS. 1, 2 and 3, an aerator 14 is supported at the center of the tank 2 on a bracket 16. Air, or other suitable gas, is supplied to the aerator through a pipe 18 projecting through the wall of the tank. As shown in FIG. 3, the aerator 14 is of conventional construction and includes a flat perforated rigid plate 19 which is supported on a pipe coupling 20 by a conical housing 22 to form a plenum chamber between the outlet end of the pipe 18 and the plate 19. A porous fabric sheet 24 is applied over the plate 19 and filler material 26 between the fabric 24 and the plate 19 diffuses the flow of air from the perforations in the plate 19. Of course, other conventional aerator structures may be substituted for the aerator illustrated in FIGS. 2 and 3, but the aerator 14 should have sufficient rigidity to maintain its effective shape and to direct a stream of gas generally upwardly through the mass of material in the tank.

The aerator 14 preferably has a diameter $D_A$ that is between one-half and three-quarters the diameter $D_S$ of the tank as measured at a horizontal cross section passing through the upper surface of the aerator. The diameter $D_A$ of the aerator is preferably about the same as or larger than the diameter of the discharge opening 4. The diameter $D_A$ of the aerator 14 should be at least twenty aerator of the largest diameter $D_T$ of the tank. The tank illustrated in FIG. 1 has a sloping sidewall 3 and a cylindrical sidewall 5. The internal diameter of the cylindrical sidewall 5 is the diameter of $D_T$. The ratio of the diameter $D_A$ of the aerator 14 to the maximum diameter $D_T$ of the tank 2 is preferably one-third, although a ratio as great as six-tenths has been found to be operable. The height of the top surface of the aerator 14 above the opening 4 is indicated by the dimension H in FIG. 1. Preferably the ratio of the diameter $D_A$ divided by H is between one-half and 3. Of course, if the tank or the aerator is not circular in horizontal cross section, the ratios described above may be converted to the span ratio which is measured in terms of the average distance across the aerator to the average distance across the tank at the maximum width or length of the tank.

In accordance with the method of this invention, air is conducted through the pipe 18 at a sufficiently high flow rate that the air passing through the upper surface of the aerator 14 flows upwardly, as indicated by the arrows 28 in FIG. 1, through the entire mass of material and upwardly through the upper surface 30. The flow of air from the aerator 14 is generally confined to a central column indicated schematically at 32. The particulate material within the column is fluidized and flows freely relative to adjacent particles. The material in the column 32 moves downwardly under the influence of gravity, as indicated by the arrows 34 in FIG. 1. Turbulence in the columm 32 causes significant mixing of the particles as they flow downwardly in the column. The flow of air from the aerator 14 also passes into the mass of material surrounding the fluidized column 32 to aerate the material, and thereby to increase flow characteristics along the sloping walls of the tank. The region surrounding the aerator between the perimeter of the aerator and the wall of the tank is highly aerated. The fluidized material 34 passes outwardly toward the wall of the tank when it reaches the top of the aerator 14 and mixes thoroughly with the aerated material moving downwardly along the wall of the tank. As a result, in the region of the cylindrical sidewall 5, the particulate material across the entire diameter of the sidewall 5 moves downwardly at substantially the same rate in the manner previously defined as plug flow. In the converging region of the sloping sidewall 3, the particles not only move downwardly, but also move transversely due to the progressively narrowing cross section of the tank. This motion of the particles assures continuous downwardly flow and thorough blending and mixing of the particles.

The aerator 14 serves as a shroud over the discharge opening 4 at the bottom of the tank. In the space between the aerator 14 and the opening 4, the particulate material is aerated and the weight of overburden material that would normally be present in this area has been eliminated, or at least substantially reduced by the shrouding presence of the aerator 14. If there should be a tendency for the material to bridge across the discharge opening 4, it is apparent that such a bridge would not be very strong because of the reduced head pressures which tend to minimize compaction of the material and produce bridges of lower strength. The fluidized column 32 is sufficiently large in relation to the maximum diameter of the tank to effectively eliminate bridges, corresponding to the bridge 10 illustrated schematically in FIG. 5. Furthermore, a relatively large diameter of fluidization projected upward plus aeration and mixing in the region between the aerator and the adjacent sloping wall has sufficient intensity to break up circumferential bridges corresponding to the bridge 12 illustrated in FIG. 6. If the top of the tank is closed, and the bottom opening 4 is open, under the proper conditions, the aerator 14 will fluidize an annular ring in the region surrounding the shrouded central area over the discharge opening 4.

It is not essential that the column 32 extend throughout the mass of material, provided the flow of gas is of sufficient height to break up or eliminate bridges in the material. For example, a hood of the same diameter as the aerator 14 may be placed in the column 32 below the surface 30 of the material. The flow of gas drawn out of the tank through the hood maintains the fluidized column 32 between the hood and the aerator.

As an example of a preferred system incorporating this invention, the tank 2 is closed, to allow pressure to build up in the tank above the top surface of the material. The height of the material between the top surface of the aerator 14 and the surface 30 of the material at the center is about ten feet, and the material in the tank is dry cement. The air pressure above the surface of the material is 37 psig, while the air pressure immediately above the surface of the aerator 14 is 41 psig. The slope of the sidewall is 68° from the horizontal, the diameter of the bottom opening 4 and of the aerator 14 are both nominally 6 inches and the horizontal cross section of the tank which also passes through the top of the aerator 14 has a diameter of 12 inches. Thus, the gap between the edge of the aerator 14 and the adjacent wall of the tank is 3 inches. The maximum diameter of the tank is 26 inches. If the tank were filled with portland cement and the top sealed, the material would discharge through the opening 4 with plug flow at a rate of more than 10,000 pounds per minute.

Figure 4:
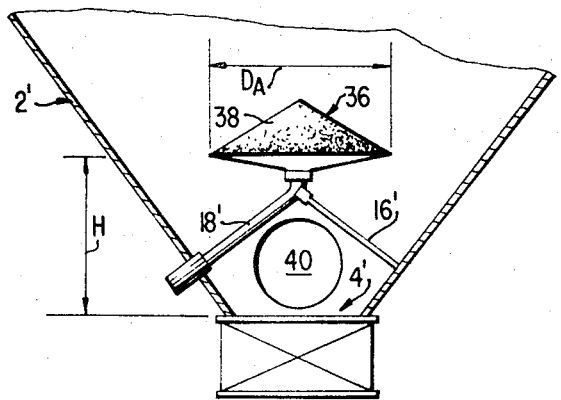
FIG. 4 is a vertical cross sectional view of the tank as in FIG. 1, but showing a modified form of the aerating device.

As an alternative, the aerator 14 may be replaced by an aerator 36 having a conical upper surface, as shown in FIG. 4. The aerator 36 is positioned over the bottom discharge opening 4' and is held in place by a support bracket 16'. Air is supplied to the interior of the aerator 36 through an inlet pipe 18'. The aerator 36 has a circular base which is substantially identical to the metal housing 22 and the conical, rigid cover 38, which may be formed of sintered bronze, high density polyethylene, a molded sand and resin material, or other suitable material is secured around the edge of the housing 22. The dimensions $D_A$ and H which apply to the preferred sizes, as discussed above in relation to the aerator 14, are indicated in FIG. 4. The sloping surface of the aerator 36 improves the divergence of material 34 which passes downward through the fluidized column 32 and toward the sidewall of the tank 2'. The aerator slope may be varied to adapt to various tank wall slopes and to the various angles of repose of different materials.

Although the method of this invention is primarily designed to improve flow through a bottom discharge opening 4 or 4' near the apex of the sidewall of the tank 2 or 2', it is also possible to achieve the benefits of this invention with certain side discharge openings. In the modified apparatus of FIG. 4, a side discharge opening 40 is shown. A suitable valve controls flow through the openings 4' and 40, so that material flows through only one of the openings at a time. Of course, the opening 4' could be replaced by a solid plate and the material could be conducted through the opening 40 along. The opening 40 is positioned between the bottom of the sidewall and the shroud 38. In this area, the material is aerated and under most conditions, flow through the opening 40 will be improved by practicing the method of this invention. This provides an outlet means for pneumatically conveying the particulate material through a pipe or hose to a remote delivery point. It also serves as a side gravity discharge point.

In FIG. 7, a bin 42 having a rectangular cross-section is illustrated. The bin 42 has an upright wall 44 and a sloping wall 46. The walls 44 and 46 define an outlet opening 48 at the bottom of the bin. An aerating device 50 is mounted on the interior of the upright wall 44 and projects across the opening 48 and has an upper surface through which gas flows in the same manner as in the aerating devices 14 and 36 of FIGS. 1 and 4, respectively. The width, $W_A$ of the device 50 is preferably about the same as, or larger than the width of the discharge opening 48. The ratio of the width $W_A$ of the device 50 to the width $W_B$ of the bin is preferably between one-quarter and three-eights. The height H of the device 50 above the opening 48 is preferably between one-half and three times the width $W_A$ of the device 50.

In FIG. 8, a bin 52 having a semi-circular cross section is illustrated. The bin 52 has an upright wall 54 and a frusto-conical wall 56. An aerating device 58 is mounted on the wall 54 and has a porous upper surface for directing a gas stream upwardly. A discharge opening 60 is provided at the bottom of the bin. The bin 52 preferably has the same physical proportions as described with respect to the tanks 2 and 2' of FIGS. 1 and 4, except that the bin 52 is divided in half by the upright wall 54.

In the bins of FIGS. 7 and 8, the fluidized column projecting upwardly from the devices 50 and 58, respectively renders the material physically unstable so that it cannot support the transverse bridges and circumferential bridges that otherwise would occur. It has been found that plug flow occurs in the bins of FIGS. 7 and 8 under the proper conditions. Thus, it is not essential for the arrangement of the aerating device and the walls to be completely symmetrical with respect to each other and with respect to the discharge opening for the system of this invention to be operative.

In accordance with this invention, an aerator of appropriate size may be installed in an existing tank with a side wall having a slope of between 20° and 80°. The aerator is positioned at the proper distance above the discharge opening to convert the tank from funnel flow or mass flow discharge to plug flow characteristics. It is merely necessary to provide a convenient support for the aerator and to install the inlet pipe 18 through the wall of the tank. These modifications can readily be performed either in an open tank or through the hatch opening in a closed tank. When properly installed, the operation of the aerator 14 provides an increase in the rate of discharge of material from the tank. In addition, the tank discharges at a uniform rate when the pressure head is constant and solids in the tank do not become segregated, but are mixed and blended. Also the material tends to flow out of the tank on a first in, first out basis and none of the material remains caked or wedged against the side of the tank.

While this invention has been described and illustrated in accordance with a preferred embodiment, it is recognized that variations and changes may be made herein without departing from the invention as set forth in the claims.

I claim:

1. A method of improving flow of dry, bulk solids in a hopper having a sloping side wall converging downwardly toward a discharge opening adjacent the bottom of the hopper, said material normally cooperating with said sloping side wall to restrict flow toward said discharge opening whereby material within the hopper forms arches abutting said sloping side wall of said hopper, said method comprising:
   a. positioning a shroud in a hopper at a height relative to a sloping side wall of the hopper selected to provide a predetermined space between an outer edge of said shroud and said side wall and at a predetermined spacing of said shroud above a discharge opening adjacent the bottom of the hopper and providing substantially unrestricted flow below the shroud and through the discharge opening whereby the shroud does not restrict flow through the discharge opening; and
   b. directing a stream of gas upwardly from said shroud and into material above said shroud and through the material in said hopper with sufficient velocity to maintain a column of the material in a fluidized state from said shroud upwardly through the portion of material normally cooperating with said sloping side wall to restrict flow and including extending the stream of gas through material forming arches abutting said sloping hopper side wall thereby aerating the material throughout a zone between said column and said sloping side wall whereby transverse and circumferential bridging is eliminated and the material flows downwardly without restriction and through the space between said shroud and said sloping side wall and into the space below said shroud and above the discharge opening.

2. A method of improving flow of dry, bulk solids in a hopper as set forth in claim 1 wherein:
   a. said directing a stream of gas upwardly into material above said shroud includes distributing the gas stream over a predetermined area of a size at least equal to an area of the discharge opening; and
   b. the predetermined area is generally circular and has a diameter in the range of between one-half and three-quarters of the diameter of said hopper as measured at a horizontal cross section passing through a lower end of said column.

3. A method of improving flow of dry, bulk solids in a hopper as set forth in claim 2 wherein:
   a. said positioning a shroud includes positioning the shroud at a geometrical center of said hopper wall with respect to a horizontal cross sectional plane; and b. the predetermined area has a diameter in the range of between one-third and six-tenths of the diameter of said hopper as measured at a horizontal cross section passing through an upper end of said sloping side wall.

4. A method of improving flow of dry, bulk solids in a hopper as set forth in claim 1 wherein:
   a. said directing a stream of gas upwardly into material above said shroud includes distributing the gas stream over a predetermined area of a size at least equal to an area of the discharge opening whereby the material in said hopper must flow through the gap between said shroud and said sloping side wall;
   b. the predetermined area is generally circular and has a diameter in the range of between one-half and three-quarters of the diameter of said hopper as measured at a horizontal cross section passing through a lower end of said column; and
   c. the diameter of the predetermined area divided by the predetermined spacing of said shroud above the discharge opening adjacent the bottom of said hopper is in the range of between one-half and 3.

5. A method of improving flow of dry, bulk solids and avoiding bridging, slugging, and segregation of particulate material while the particulate material is being discharged from a hopper having opposite sloping wall portions converging toward a discharge opening at the bottom of the hopper, said material normally cooperating with said sloping wall portions to restrict flow toward the discharge opening and forming arches abutting said sloping side wall portions of said hopper, said method comprising:
   a. positioning a shroud in a hopper having opposite sloping wall portions converging toward a discharge opening at the bottom of the hopper and at a selected location spaced above a discharge opening adjacent the bottom of the hopper and providing substantially unrestricted flow below the shroud and through the discharge opening; and
   b. directing a stream of gas upwardly from the selected location and in a column thereby fluidizing a portion of particulate material in the hopper and breaking transverse arches of the material extending between opposite sloping wall portions of the hopper and aerating the material between said fluidized column and the opposite sloping wall portions of said hopper and thereby passing said material in an aerated state through a space between the lower end of said fluidized column and said hopper walls and into a space under the lower end of said fluidized column and subsequently through the discharge opening whereby the material is discharged from said hopper without forming rat holes, arches, and circumferential bridging and the material is mixed as it passes through the converging portion of said hopper.

6. A method of improving flow of dry, bulk solids in a hopper as set forth in claim 5 wherein:
   a. said fluidizing a portion of particulate material in the hopper includes directing a stream of gas upwardly into material above said shroud and distributing the gas stream over a predetermined area of a size at least equal to an area of the discharge opening and having a width of the fluidized column such that the width divided by the spacing of the selected location above said discharge opening adjacent the bottom of said hopper is in the range of between one-half and three whereby there is a space under the lower end of said fluidized column and above the discharge opening for expansion of the aerated material thereinto;
   b. the predetermined area has the width thereof in the range of between one-half and three-quarters of the width of said hopper as measured at a horizontal cross section passing through a lower end of said fluidized column whereby the fluidized column is of a size to break up material arches abutting said sloping wall portions of said hopper and there is a substantial gap between the lower end of said fluidized column and the opposite sloping wall portions of said hopper; and said directing a stream of gas upwardly into material above said shroud includes directing same under a pressure above atmospheric whereby the gas in the space above the material is above atmospheric whereby the aerating said material between said fluidized column and the opposite sloping wall portions of said hopper includes aerating at least a portion of the material at locations where circumferential bridges are likely to occur.

7. A method of improving flow of ry, bulk solids in a hopper as set forth in claim 5 including:
   a. directing the stream of gas upwardly with sufficient velocity to extend the stream of gas upwardly to the top surface of the particulate material within the hopper; and
   b. confining a space above the material within said hopper whereby the gas flows downwardly through the material and through the space between the lower end of said fluidized column and said hopper walls.

8. A method of discharging particulate material from a hopper having a substantially frusto-conical side wall converging toward a discharge opening at the bottom thereof, said side wall having a slope sufficiently great to cause bridging within the material during gravity flow through the discharge opening, said method comprising:
   a. introducing particulate material into a hopper having a substantially frusto-conical side wall converging downwardly toward a discharge opening at the bottom thereof and having a slope sufficiently great to cause bridging within the material during gravity flow through the discharge opening;
   b. directing a stream of gas upwardly from a selected location above the discharge opening in a column extending upwardly therefrom thereby fluidizing a central column of the material, said fluidized column having the lower end thereof spaced above said discharge opening and extending across the width of said hopper a distance between one-half and three-quarters of the width of said hopper as measured at a horizontal cross section passing through the lower end of the fluidized column whereby the fluidized column is of a size to break up material arches abutting said sloping wall portions of the hopper;
   c. confining a space above the material within said hopper whereby the gas flows through the material thereby aerating the material in said hopper throughout a zone between said fluidized column and said sloping side wall whereby transverse and circumferential bridging is eliminated and the material flows downwardly without restriction and through a space between the lower end of said fluidized column and said sloping side wall and into a space below said lower end of said fluidized column and above the discharge opening; and d. withdrawing material through said discharge opening from the zone between the lower end of said fluidized column and the bottom of said side wall.

9. A method of discharging particulate material from a hopper as set forth in claim 8 wherein:

a. said directing a stream of gas upwardly from a selected location includes directing same under a pressure above atmospheric thereby applying fluid pressure above atmospheric pressure to a top surface of the material in said hopper;

b. said fluidizing a column of material includes shrouding said discharge opening from said fluidized column; and c. said shrouding said discharge opening from said fluidizing column includes deflecting the material from said fluidized column toward said side wall whereby flow of the material through the space between the lower end of said fluidized column and said sloping side wall and into the space below said lower end of said fluidized column and above the discharge opening is improved.

* * * * *